(12) United States Patent
Womac et al.

(10) Patent No.: US 11,159,032 B2
(45) Date of Patent: Oct. 26, 2021

(54) CHARGE TERMINATION CIRCUIT

(71) Applicant: TEXAS INSTRUMENTS INCORPORATED, Dallas, TX (US)

(72) Inventors: Austin Womac, Knoxville, TN (US); Eric Southard, Richardson, TX (US); Orlando Lazaro, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 114 days.

(21) Appl. No.: 16/528,248

(22) Filed: Jul. 31, 2019

(65) Prior Publication Data
US 2021/0036524 A1 Feb. 4, 2021

(51) Int. Cl.
*H01M 10/46* (2006.01)
*H02J 7/00* (2006.01)
*H02M 7/48* (2007.01)

(52) U.S. Cl.
CPC .............. *H02J 7/0026* (2013.01); *H02J 7/00* (2013.01); *H02J 7/0021* (2013.01); *H02J 7/0072* (2013.01); *H02M 7/48* (2013.01); *H02J 7/00302* (2020.01)

(58) Field of Classification Search
CPC ...... H02J 7/48; H02J 7/00302; H02J 7/00306; H02J 2207/20; H02M 3/156; H02M 3/02; H02M 7/48

USPC .......................... 320/107, 132, 134, 136, 149
See application file for complete search history.

(56) References Cited

U.S. PATENT DOCUMENTS

| 8,324,869 B2 * | 12/2012 | Nguyen | H02M 3/156 320/166 |
| 2013/0181659 A1 * | 7/2013 | Chang | H02J 7/045 320/107 |
| 2019/0058398 A1 | 2/2019 | Sharifi et al. | |

* cited by examiner

*Primary Examiner* — Edward Tso
(74) *Attorney, Agent, or Firm* — Michelle F. Murray; Charles A. Brill; Frank D. Cimino

(57) ABSTRACT

Aspects of the disclosure include a first sense transistor having a gate and a drain configured to couple in parallel with a high-side transistor and a source terminal coupled to a first node, and a second sense transistor having a gate and a drain configured to couple in parallel with a low-side transistor, and a source terminal coupled to a third node. The circuit further includes a first comparator circuit having a first input coupled to the first node, a second input coupled to a second node, and an output, a second comparator circuit having a first input coupled to the third node, a second input coupled to a ground node, and an output, and a logic circuit having first input coupled to the output of the first comparator circuit, a second input coupled to the output of the second comparator circuit, and an output.

22 Claims, 6 Drawing Sheets

CHARGE TERMINATION CIRCUIT

BACKGROUND

Many modern devices include rechargeable batteries. These rechargeable batteries are recharged, in some circumstances, subject to the control of a charger, charge controller, or other circuit that manages the delivery of power to and/or from the battery. When recharging a battery, if the battery is not charged for a long enough period of time, the battery will not have a full charge and will have reduced runtime when compared to the runtime corresponding to a fully-charged battery. If the battery is charged for too long a period of time, extending beyond the time at which the battery has fully charged to its maximum capacity, the battery can experience damage or other degradation in quality such that a useable lifespan of the battery is reduced and/or the maximum capacity of the battery to which the battery is charged for a full charge is reduced. Accordingly, the charger, charger controller, and/or other circuit may control when charging of the battery terminates to prevent under and/or over charging of the battery.

SUMMARY

Aspects of the present disclosure provide for a circuit. In at least some examples, the circuit includes a first current sense transistor having a gate terminal and a drain terminal configured to respectively couple in parallel with a high-side power transistor, and a source terminal coupled to a first node. The circuit further includes a first comparator circuit having a first input coupled to the first node, a second input coupled to a second node, and an output. The circuit further includes a second current sense transistor having a gate terminal and a drain terminal configured to respectively couple in parallel with a low-side power transistor, and a source terminal coupled to a third node. The circuit further includes a second comparator circuit having a first input coupled to the third node, a second input coupled to a ground node, and an output. The circuit further includes a logic circuit having first input coupled to the output of the first comparator circuit, a second input coupled to the output of the second comparator circuit, and an output. The circuit further includes a filter having an input coupled to the output of the logic circuit and an output a first comparator having a first input coupled to a fourth node, a second input coupled to the output of the filter, and an output coupled to a fifth node.

Other aspects of the present disclosure provide for a circuit. In at least some examples, the circuit includes a first current sense transistor having a gate terminal and a drain terminal configured to respectively couple in parallel with a high-side power transistor, and a source terminal coupled to a first node. The circuit further includes a second current sense transistor having a gate terminal and a drain terminal configured to respectively couple in parallel with a low-side power transistor, and a source terminal coupled to a second node. The circuit further includes a first chopped comparator circuit configured to generate a first comparison result based on values present at the first node and a third node. The circuit further includes a second chopped comparator circuit configured to generate a second comparison result based on values present at the second node and the ground node. The circuit further includes a logic circuit configured to generate a logic output based on the first comparison result and second comparison result. The circuit further includes a filter configured to filter the logic output and a first comparator configured to compare a reference signal to the filtered output signal of the logic circuit and generate a first comparison result based on a value of the reference signal with respect to the filtered output signal of the logic circuit.

Other aspects of the present disclosure provide for a system. In at least some examples, the system includes a battery coupled between a first node and a ground node and a battery charger configured to charge the battery and terminate charging the battery when a charge current falls below a threshold. In some examples, the battery charger includes a switching converter configured to switch a bus voltage between a second node and a third node and couple, at the third node, to an inductor coupled between the third node and the first node. The battery charger further includes a charge current measurement circuit configured to monitor charging of the battery. The charge current measurement circuit includes a first current sense transistor having a gate terminal and a drain terminal configured to respectively couple in parallel with a high-side transistor of the switching converter, and a source terminal coupled to a fourth node. The charge current measurement circuit further includes a second current sense transistor having a gate terminal and a drain terminal configured to respectively couple in parallel with a low-side transistor of the switching converter, and a source terminal coupled to a fifth node. The charge current measurement circuit further includes a first chopped comparator circuit configured to generate a first comparison result based on values present at the fourth node and the third node. The charge current measurement circuit further includes a second chopped comparator circuit configured to generate a second comparison result based on values present at the fifth node and the ground node. The charge current measurement circuit further includes a logic circuit configured to generate a logic output based on the first comparison result and second comparison result. The charge current measurement circuit further includes a filter configured to filter the logic output. The charge current measurement circuit further includes a first comparator configured to compare a reference signal to the filtered output signal of the logic circuit, the reference signal representative of the threshold and generate a first comparison result based on a value of the reference signal with respect to the filtered output signal of the logic circuit.

BRIEF DESCRIPTION OF THE DRAWINGS

For a detailed description of various examples, reference will now be made to the accompanying drawings in which.

DETAILED DESCRIPTION

Figure 1:
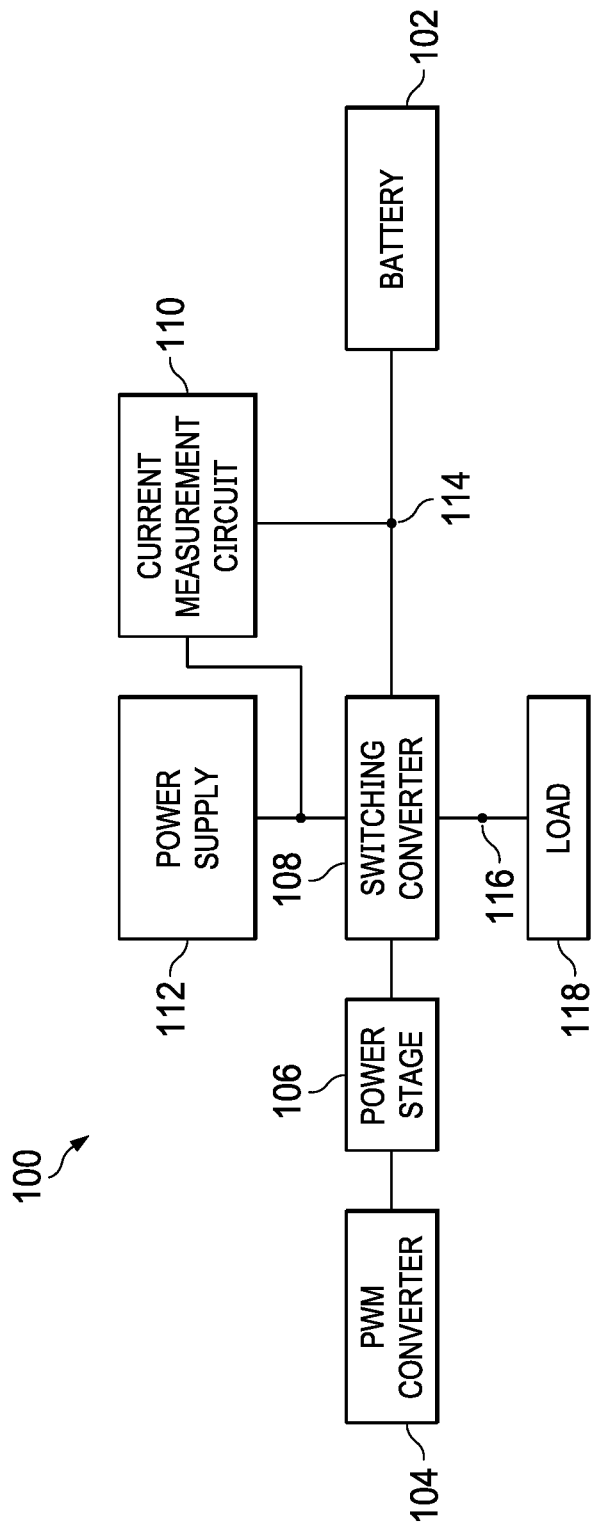
FIG. 1 shows a block diagram of an illustrative system in accordance with various examples.

Certain approaches exist for a charger to determine a termination condition, or a time for terminating, charging of a rechargeable battery. One example of these approaches can include implementing a sense element in an output path of a switching converter of the charger. However, when the sense element is located in the output path of the switching converter, the sense element consumes some non-zero amount of power, introducing a loss into operation of the charger. This reduces efficiency of the switching converter, and therefore the charger, by increasing an amount of power consumed by the charger but not passed to a battery being charged by the charger or a system being powered by an output of the charger. Furthermore, measurement accuracy of such systems positioning a sense element in an output path of the switching converter is limited, in some examples, to about 1 amp (A).

At least some aspects of the present disclosure provide for a circuit for use in charging a battery. The circuit is, in some examples, a battery charger or a battery charger controller that includes a switching converter. In at least some examples, the circuit provides for lossless current measurement, enabling determination of a battery charging termination condition without consuming power in an output path of a switching converter of a charger. The lossless current measurement is, in some examples, accurate to approximately 100 milliamps (mA) of current with a variation of plus or minus 30 percent. In at least some examples, the circuit is controlled to operate according to continuous conduction mode (CCM) operation. Current sense devices, such as field-effect transistors (FETs) are placed in parallel with high side and low side FETs of the switching converter, outside of the output path of the switching converter, to sense a current of the high side FET and low side FET without causing loss in the output path of the switching converter. Cycle-by-cycle comparators compare outputs of each of the current sense devices to determine whether a sensed current has reached a desired termination level. Input-referred offsets of the comparators are optimized, in some examples, by chopping positive and negative inputs of each of the respective comparators. Outputs of each of the comparators are processed by a logic circuit (e.g., such as a logical OR circuit) and an output of the logic circuit is sent to a filter. When an output of the filter rises to be equal to, or greater than, one-half of a supply voltage of the switching converter, the charger terminates charging of a rechargeable battery coupled to the charger.

In at least some examples, the disclosed circuit provides for charge termination determinations to be made with greater accuracy (e.g., about 100 mA+/−30%) and at greater efficiency (e.g., without including a resistive sense element in an output path of a switching converter of the circuit) than other lossless charging systems. In some examples, the accuracy is achieved at least in part by chopping the inputs of the comparators to mitigate input-referred offsets received at the respective comparators.

Turning now to FIG. 1, a block diagram of an illustrative system 100 is shown. In at least some examples, the system 100 is representative of a device that includes, or couples to, a rechargeable battery 102 and is configured to recharge the rechargeable battery 102. For examples, in various implementations the system 100 is representative of a computing device such as a smart phone, a portable computer (e.g., laptop, netbook, notebook, etc.), a tablet computing device, a wearable computing device (e.g., such as smart watch, smart glasses, hearing assist devices, etc.), an automobile or other transportation device including a rechargeable battery, or any other suitable device that includes, or couples to, a battery and includes a means for recharging the battery. At least some of the foregoing examples of devices that may be represented by the system 100 benefit from implementation of the teachings of the present disclosure. These benefits include more accurate battery charging such that a battery accurately stops discharging when the battery is deemed fully charged, without ceasing charging too soon and leaving the device with a less than fully-charged battery, while also preventing the battery from continuing to be charged after being deemed fully-charged, preventing damage to the battery and a degradation in battery performance and lifespan.

The system 100, in at least some examples, includes a pulse-width modulation (PWM) converter 104, a power stage 106, a switching converter 108, and a current measurement circuit 110. In some examples, the power stage 106 is referred to as, or implemented as, a gate driver and the PWM converter 104 and the power stage 106 together form a controller. In other examples, the PWM converter 104 alone is referred to as a controller. The PWM converter 104 is configured to receive a plurality of signals and, based at least partially on the plurality of signals, generate a PWM signal. The power stage 106 is coupled to the PWM converter 104 and configured to receive the PWM signal generated and output by the PWM converter 104. Based on the PWM signal, the power stage 106 generates one or more control signals for controlling the switching converter 108 and the current measurement circuit 110. For example, based on the PWM signal the power stage 106 generates a high side control signal (HSCTRL) and a low side control signal (LSCTRL) and outputs HSCTRL and LSCTRL to the switching converter 108 and the current measurement circuit 110 at least partially for controlling operation of one or more transistors (not shown) of the switching converter 108 and the current measurement circuit 110.

Based on HSCTRL and LSCTRL, the switching converter 108 switches power received from a power supply 112 to a node 114 for charging the battery 102. In at least some examples, the power received from the power supply 112 is also provided to a node 116 for powering a load 118, such as one or more other components of the system 100. The switching converter 108 is, in some examples, a boost power converter, a buck power converter, or a buck-boost power converter. The current measurement circuit 110 couples in parallel with the switching converter 108 to determine a current flowing from the switching converter 108 to the battery 102 for charging and generate a charging termination control signal (TERM) when a termination condition is met, causing the system 100 to stop charging the battery 102. In at least some examples, the switching converter 108 operates in CCM operation to charge the battery, increasing accuracy of the current measurement circuit 110, and therefore increasing charging precision of the system 100, when compared to a system in which the switching converter 108 is not controlled to operate in CCM operation.

The current measurement circuit 110, in at least some examples, detects and monitors an output current of the switching converter 108 (e.g., such as a current flowing through one or more components of the switching converter, such as a high side FET controlled by HSCTRL and/or a low side FET controlled by LSCTRL). The detected output current is compared to a termination current reference signal by a comparator (not shown). The comparator is, in some examples, a chopped comparator at which the termination current reference signal and a signal representing the output current of the switching converter 108 are alternated between positive and negative input terminals of the comparator to mitigate input-referred offset in a comparison result output by the comparator. When a logic circuit (not shown) indicates that the output of the comparison for the high side FET or the low side FET of the switching converter 108 indicates that the detected output current exceeds the termination threshold rises (e.g., as determined by an resistor-capacitor (RC) filter or timer) to a value of approximately one-half of the value of a supply voltage of the logic circuit (such as a signal output by, or derived from an signal output by, the power supply 112), the current measurement circuit 110 determines (such as via another comparison to another reference signal) that the termination condition is met, causing the system 100 to stop charging the battery 102. In at least some examples, because the output of the logic circuit is processed by a RC filter, the output of the logic circuit is averaged. The averaging of the output of the logic circuit enables chopping of the inputs to the chopped comparator, discussed above, to mitigate input-referred offset of the chopped comparator with each switching cycle of the switching converter 108, averaging out the input-referred offset of the chopped comparator without additional compensation circuitry in a manner not otherwise suitable for at least some circuit implementations, such as when averaging is not performed.

Figure 2:
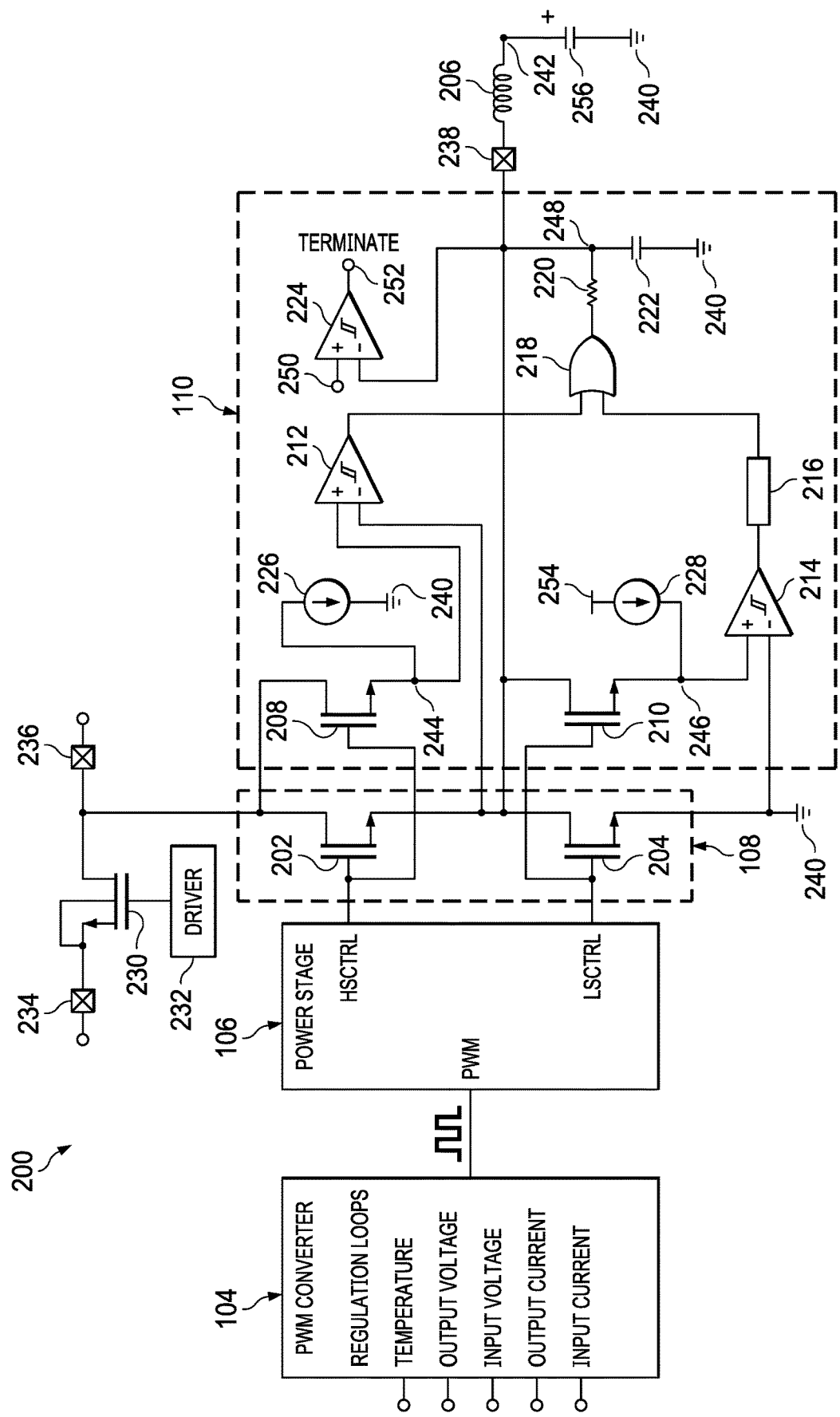
FIG. 2 shows a schematic diagram of an illustrative circuit in accordance with various examples.

Turning now to FIG. 2, a schematic diagram of an illustrative circuit 200 is shown. In at least some examples, the circuit 200 is suitable for implementation as the system 100 (e.g., at least some aspects of the circuit 200 are illustrative of a circuit-level representation of components shown in the system 100 as blocks). The circuit 200 includes, in some examples, the PWM converter 104, the power stage 106, the switching converter 108, and the current measurement circuit 110 of the system 100. The switching converter 108 includes, in some examples, a FET 202, and a FET 204. In some examples, the switching converter 108 further includes an inductor 206, while in other examples the inductor 206 is not a component of the switching converter 108 (e.g., not disposed on a same die and/or in a same component package as the switching converter 108), but is instead configured to couple to the switching converter 108. The current measurement circuit 110 includes, in some examples, a FET 208, a FET 210, a comparator 212, a comparator 214, a delay circuit 216, a logic circuit 218, a resistor 220, a capacitor 222, a comparator 224, a current source 226, and a current source 228. In some examples, the circuit 200 further includes a FET 230 and a driver 232. The resistor 220 and the capacitor 222, in at least some examples, form an RC filter or timer.

In at least some example architectures, the FET 230 has a source terminal coupled to a node 234, a drain terminal coupled to a node 236, and a gate terminal coupled to, and configured to receive a control signal from, the driver 232, where the control signal controls the FET 230 to place the FET 230 in a conductive state between the source and drain terminals of the FET 230 (e.g., turned-n) or in a non-conductive state between the source and drain terminals of the FET 230 (e.g., turned-off). The FET 202 has a drain terminal coupled to the node 236, a source terminal coupled to a node 238, and a gate terminal. The FET 204 has a drain terminal coupled to the node 238, a source terminal coupled to a ground node 240, and a gate terminal. The power stage 106 has a first output (e.g., a HSCTRL output) terminal coupled to the gate terminal of the FET 202 and a second output (e.g., a LSCTRL output) terminal coupled to the gate terminal of the FET 204. The power stage 106 further has an input (e.g., a PWM input) terminal coupled to, and configured to receive a PWM signal output from, an output terminal of the PWM converter 104.

The PWM converter 104 has any one or more inputs each configured to receive a respective signal, at least some of which are used in determining and/or generating an output of the PWM converter 104. For example, and although not shown, one or more components may be added to the circuit 200 to provide feedback to the PWM converter 104 for use in determining and/or generating an output of the PWM converter 104, such as components that provide information to the PWM converter 104, including information related to temperature, output voltage of the circuit 200, input voltage of the circuit 200, output current of the circuit 200, input current of the circuit 200, charge termination (e.g., as determined by the current measurement circuit 110), etc. The inductor 206 is coupled between the node 238 and a node 242.

The FET 208 has a drain terminal coupled to the node 236, a source terminal coupled to a node 244, and a gate terminal coupled to the first output of the power stage 106. The FET 210 has a drain terminal coupled to the node 238, a source terminal coupled to a node 246, and a gate terminal coupled to the second output of the power stage 106. The comparator 212 has a first input (e.g., a positive input) terminal coupled to the node 244, a second input (e.g., a negative input) terminal coupled to the node 238, and an output terminal. The comparator 214 has a first input (e.g., a positive input) terminal coupled to the node 246, a second input (e.g., a negative input) terminal coupled to the ground terminal 240, and an output terminal coupled to an input terminal of the delay circuit 216. The delay circuit 216 is any component or components having functionality of providing a selectable and/or programmable delay to an output signal of the comparator 214 prior to providing the delayed signal at an output terminal of the delay circuit 216. A first input terminal of the logic circuit 218 is coupled to the output terminal of the comparator 212, a second input terminal of the logic circuit 218 is coupled to the output terminal of the delay circuit 216, and an output terminal of the logic circuit 218 is coupled to a node 248 through the resistor 220. The capacitor 222 is coupled between the node 248 and the ground terminal 240. The comparator 224 has a first input (e.g., a positive input) terminal coupled to a node 250, a second input (e.g., a negative input) terminal coupled to the node 248, and an output terminal coupled to a node 252. The current source 226 is coupled between the node 244 and the ground terminal 240 and configured to sink current from the node 244. The current source 228 is coupled between the node 246 and a power supply 254 outputting a supply signal REGN and configured to source current to the node 246.

In at least some examples, the node 234 is an input terminal of the circuit 200 (e.g., exposed as an accessible pin, pad, terminal, or other element of a die or package containing the circuit 200 for use in coupling to the circuit 200). For example, when the circuit 200 is implemented as a battery charging circuit for charging a battery, a supply signal or bus voltage (VBUS) is received at the node 234 for use in charging the battery. Similarly, in at least some examples the node 238 is an output terminal of the circuit 200 (e.g., exposed as an accessible pin, pad, terminal, or other element of a die or package containing the circuit 200 for use in coupling to the circuit 200). For example, in some implementations of the circuit 200 as a battery charging circuit, the inductor 206 is an external component that is coupled between the output terminal of the circuit 200 and the battery for charging. In other examples, such as when the inductor 206 is an internal component of the circuit 200, the node 242 is the output terminal of the circuit 200 to which the battery couples for charging. In at least some examples, the node 252 is another output terminal of the circuit 200, while in other examples the node 252 is only an internal node of the circuit 200. In at least some examples, the node 236 is yet another output terminal of the circuit 200. The node 236 is, in some examples, referred to as a power middle (PMID) node to which a load or other components of a system implementing the circuit 200 may couple to receive power, via the circuit 200, from the node 234. In yet other examples, at least some of the input terminals of the PWM converter 104 may couple to input terminals of the circuit 200 to receive one or more signals for use in generating a PWM output signal of the PWM converter 104.

In an example of operation of the circuit 200, the PWM converter 104 generates a PWM signal for controlling the power stage 106 to control the switching converter 108 to charge a battery 256 coupled to the node 242. In at least some examples, the current measurement circuit 110 measures a current flowing through the switching converter 108 (e.g., such as a charging current of the battery 256) to determine whether a termination condition for terminating charging of the battery 256 has been met. When the termination condition has been met, in at least some examples, the PWM converter 104 generates the PWM signal having a value and/or signal characteristics that cause the power stage 106 to control the switching converter 108 to terminate charging the battery 256. In some examples, the PWM converter 104 generates the PWM signal that causes termination of charging of the battery 256 based on a TERMINATE (TERM) signal output by the current measurement circuit 110 (e.g., as provided at the node 252) and provided to the PWM converter 104. The PWM converter 104 generates the PWM signal, in some examples, such that the switching converter 108 is controlled to operate according to CCM operation. For example, at least some implementations of the PWM converter 104 and/or the power stage 106 lack a zero current limit comparator (not shown), or include the zero current limit comparator in a manner configurable to be disabled under certain conditions. In this way, the PWM converter 104 and/or the power stage 106 includes functionality for permitting the FET 204 to continue operation in a conductive state when current becomes negative, as there is no zero current limit comparator active to detect the zero crossing of the current signal and to disable the FET 204. This creates the CCM operation discussed herein. In at least some examples, such as when the zero current limit comparator is not included in the PWM converter 104 or the power stage 106, the CCM operation is said to be forced. In at least some examples, the FET 230 is a blocking FET controlled by the driver 232 to prevent the flow of current in a direction from the node 236 to the node 234, such as when a power supply is not coupled to the node 234 (e.g., prevent negative current from flowing to the node 234, such as caused by converter boost back from, the switching converter 108). In at least some examples, similar blocking may be performed through the use of other suitable components, such as one or more diodes individually, or collectively, having suitable power characteristics for use in the circuit 200.

The switching converter 108, while illustrated as a buck power converter, may instead be a boost power converter or a buck-boost power converter, and components of, or associated with, the switching converter 108 may be added, relocated, removed, etc. to provide the boost or buck-boost functionality while not departing from the scope or spirit of the present disclosure. Particularly, the current measurement techniques discussed herein (e.g., as performed by the current measurement circuit 110) are equally applicable whether the switching converter 108 is a buck converter as illustrated, a boost converter, or a buck-boost converter.

The current measurement circuit 110 is implemented to measure an output current of the switching converter 108 in a lossless manner. For example, the measurement performed by the current measurement circuit 110 is considered lossless because a resistive element (which would incur some non-zero power consumption or loss) is not located in an output path of the switching converter 108 or circuit 200 for measuring the output current. Instead, the FET 208 is implemented as a sense FET to sense or detect an amount of current flowing through the FET 202 and the FET 210 is implemented as a sense FET to sense or detect an amount of current flowing through the FET 204. The amount of current flowing through the FET 202 and the FET 204 is representative of the output current of the switching converter 108. Therefore, an amount of current flowing through the FET 208 and the FET 210 is representative of the output current of the switching converter 108. In at least some examples, physical characteristics (e.g., such as transistor channel length and/or width) of the FET 208 and the FET 210 are modified from those of the FET 202 and the FET 204 such that the amount of current flowing through the FET 208 and the FET 210 is reduced according to a ratio from the amount of current flowing through the FET 202 and the FET 204. The ratio is that of the physical characteristics of the FET 208 and FET 210 to the physical characteristics of the FET 202 and FET 204, respectively.

The current source 226 and the current source 228 set charge termination current thresholds for the FET 202 and the FET 204, respectively. For examples, the current source 226 sinks an amount of current defined as I_TERM_HS from the node 244 and the current source 228 sources an amount of current defined as I_TERM_LS to the node 246. The comparator 212 monitors the node 244, at which a signal VSNS_HS_ITERM is present, and the node 238, at which a signal SW is present, to determine and generate an output signal HS_TERM_ILIM_int. In conventional architectures, a comparator indicates whether a value received at one input terminal of the comparator is greater than, or less than, an input received at a second input terminal of the comparator. In the circuit 200, the comparator 212 is a chopped comparator with an output that is later averaged. For example, during a first switching cycle of the switching converter 108, a first input terminal of the comparator 212 is coupled to the node 244 and a second input terminal of the comparator 212 is coupled to the node 238. During a second switching cycle of the switching converter 108, the first input terminal of the comparator 212 is coupled to the node 238 and the second input terminal of the comparator 212 is coupled to the node 244, and the output of the comparator 212 is logically inverted. In this way, offsets between the first input terminal and the second input terminal of the comparator, known as input referred offsets, are mitigated in HS_TERM_ILIM_int. Similarly, the comparator 214 monitors the node 246, at which a signal VSNS_LS_ITERM is present, and the node 238, at which a signal SW is present, to determine and generate an output signal LS_TERM_ILIM_int. In at least some examples, the comparator 214 is a chopped comparator operating in substantially a same manner as discussed above with respect to the comparator 212. In at least some examples, the delay element 216 delays LS_TERM_ILIM_int by a non-zero amount to compensate for a timing mismatch between generation of HS_TERM_ILIM_int by the comparator 212 and LS_TERM_ILIM_int by the comparator 214. Compensating for differences in propagation delay in generating HS_TERM_ILIM_int and LS_TERM_ILIM_int, in at least some examples, mitigates and/or prevents the differences in propagation delay from introducing and/or contributing to accuracy error in current detection in the system 100 (e.g., such as by the current measurement circuit 110).

As discussed above, the switching converter 108 is controlled to operate according to CCM operation. The CCM operation permits a negative current to be present at the node 238 (e.g., a current flowing from the inductor 206 through the node 238 as opposed to flowing through the node 238 to the inductor 206). By controlling (e.g., forcing) the switching converter 108 to operate according to CCM operation, an average output current of the switching converter 108 (a current flowing through the inductor 206) is approximately equal to I_TERM_HS when HS_TERM_ILIM_int has a 50 percent duty cycle or approximately equal to I_TERM_LS when LS_TERM_ILIM_int has a 50 percent duty cycle. If the switching converter 108 were not controlled to operate according to CCM operation, this relation would not be true and a 50 percent duty cycle of HS_TERM_ILIM_int would not indicate crossing of I_TERM_HS and a 50 percent duty cycle of LS_TERM_ILIM_int would not indicate crossing of I_TERM_LS.

HS_TERM_ILIM_int and an output of the delay circuit 216 are each provided to the logic circuit 218. In at least some examples, the logic circuit 218 is a digital logic OR gate. In other examples, the logic circuit 218 is any component or components that provide the functionality of generating an output based on a logical operation (such as a logical OR operation) performed on one or more inputs received by the logic circuit 218. The logic circuit 218, in at least one example, determines whether HS_TERM_ILIM_int or the output of the delay circuit 216 (which is merely a delayed version of LS_TERM_ILIM_int) has a logical high value. When either HS_TERM_ILIM_int or the output of the delay circuit 216 has a logical high value, an output signal TERM_DC of the logic circuit 218 has a logical high value (e.g., a value approximately equal to a value of a supply signal received by the logic circuit 218). Otherwise, the logic circuit 218 outputs a signal having a logical low value (e.g., approximately equal to zero volts).

TERM_DC is filtered by the filter formed of the resistor 220 and the capacitor 222 such that a filtered signal TERM_DC_filt is present at the node 248 with a voltage of TERM_DC_filt representing an approximately average voltage (e.g., an approximately average value of (VDD-VSS) *X, where VDD and VSS are supply sources of the logic circuit 218 such that (VDD-VSS) is approximately equal to a reference voltage (VREF) multiplied by 2, and X is a decimal representation of a duty cycle of TERM_DC). The comparator 224 compares VREF to TERM_DC_filt and, when TERM_DC_filt is less than VREF, outputs TERM having a logical high value, indicating that a desired charging current threshold, as indicated by I_TERM_HS or I_TERM_LS has been reached, and instructing the PWM converter 104 or another component to control, directly or indirectly, the switching converter 108 to terminate charging the battery 256. Otherwise, when VREF is not greater than TERM_DC_filt, the comparator 224 outputs TERM having a logical low value and charging of the battery 256 continues. In at least some examples, VREF has a value approximately equal to one-half of the value of the supply signal received by the logic circuit 218.

In at least some examples, the forced CCM operation discussed herein increases a current detection accuracy of the circuit 200 over other current detection circuits that do not operate according to forced CCM operation. For example, some implementations of the circuit 200 have improved accuracy over alternative implementations in which current information of a blocking FET is divided by an expected duty cycle of a high side FET of a power converter, thus introducing sources of accuracy error. For example, the sources of error can include any current flowing in the blocking FET that does not flow to the output, which can include current draw of a power stage gate driver. Additionally, the expected duty cycle of the high side FET can be difficult to accurately determine because of variation in gate driver delays across process/voltage/temperature. These difficulties, among others, are at least partially mitigated, if not circumvented, by the various techniques, processes, and/or circuits of the present disclosure.

Figure 3:
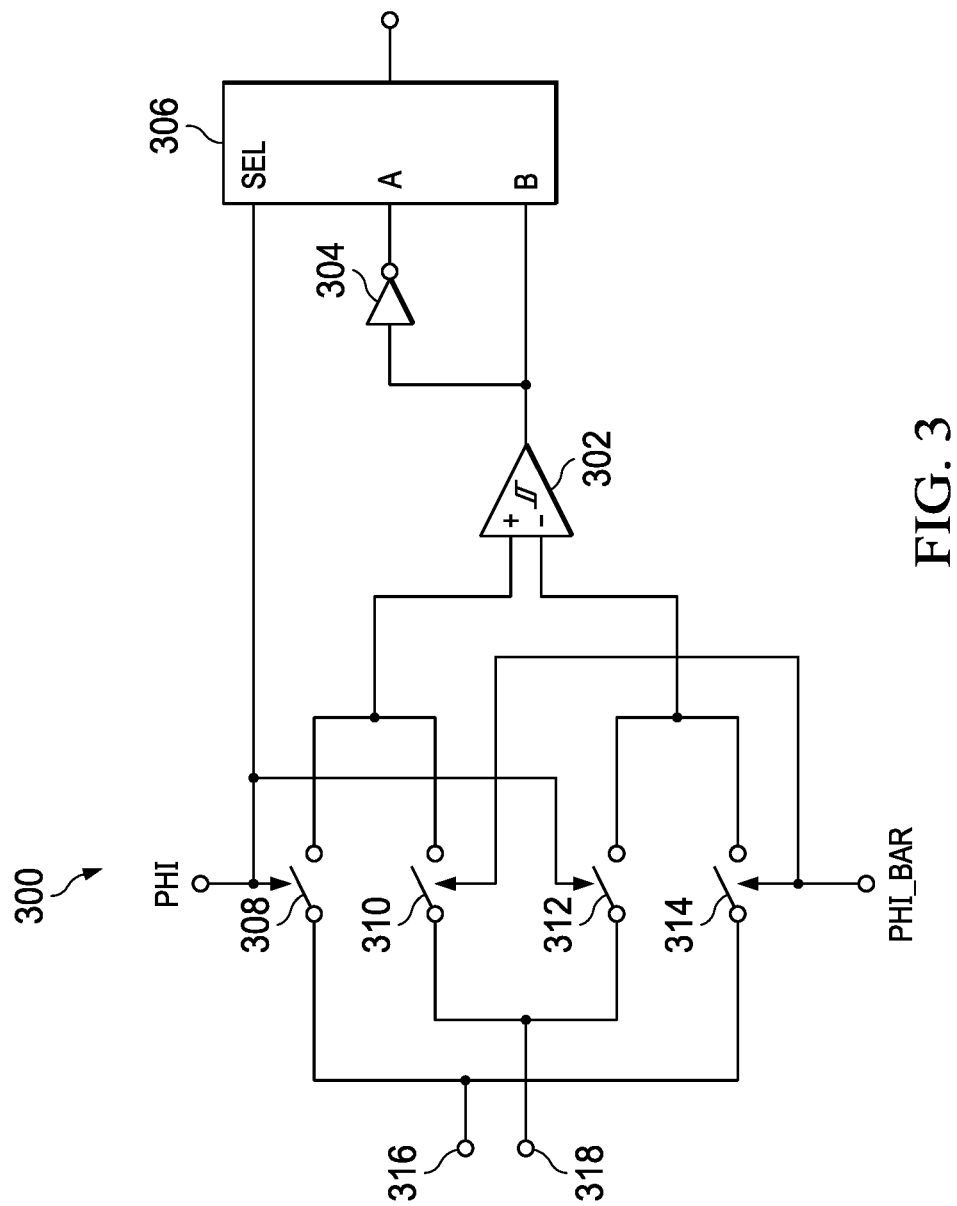
FIG. 3 shows a schematic diagram of an illustrative circuit in accordance with various examples.

Turning now to FIG. 3, a schematic diagram of an illustrative circuit 300 is shown. In at least some examples, the circuit 300 is suitable for implementation as the comparator 212 and/or the comparator 214. In some examples, the circuit 300 includes a comparator 302, an inverter circuit 304, a multiplexor 306, a switch 308, a switch 310, a switch 312, and a switch 314. The comparator 302 has a first input (e.g., positive input) terminal coupled to a first node 316 via the switch 308 and coupled to a second node 318 via the switch 310. The comparator 302 further has a second input (e.g., negative input) terminal coupled to the second node 318 via the switch 312 and coupled to the first node 316 via the switch 314. An output terminal of the comparator 302 is coupled to an input terminal of the inverter circuit 304 and a second input terminal of the multiplexor 306. An output terminal of the inverter circuit 304 is coupled to a first input terminal of the multiplexor 306. An output terminal of the multiplexor 306 is the output terminal of the circuit 300. The switch 308 and switch 312 each receive a control signal (PHI) and the switch 310 and the switch 314 each receive an inverse of the control signal (PHI_BAR). When PHI or PHI_BAR has a logical high value, the respective controlled switches are closed crating a conductive path. When PHI or PHI_BAR has a logical low value, the respective controlled switches are closed forming an electrically open path. An input selection terminal (SEL) of the multiplexor 306 also receives PHI.

In at least some examples, the comparator 302 includes an input referred offset. Input referred offset is, in some examples, an error or errors introduced into signal measurements by random electrical noise, fabrication variation, and/or systematic circuit topology issues. In conventional comparator implementations, the input referred offset can cause inaccuracy in an output of the comparator. For example, If a conventional comparator implementation receives signals A and B, and the conventional comparator is configured such that a logical high value is output when A is greater than B, an input referred offset of that conventional comparator can cause a logical high value to be output instead when A is greater than B minus the input referred offset but not greater than B. Additionally, instead of the logical high value being output when A becomes more than B, the input referred offset of the conventional comparator can cause the logical high value to be output instead when A is greater than B plus the input referred offset.

To mitigate effects of input referred offset, the circuit 300 implements the comparator 302 as a chopped comparator. By implementing the comparator 302 as a chopped comparator, the input terminals of the comparator 302 are alternatingly coupled between the first node 316 and the second node 318. For example, during a first cycle of operation, the switches 308-314 are controlled such that the first input terminal of the comparator 302 is coupled to the node 316 and the second input terminal of the comparator 302 is coupled to the node 318. During a second cycle of operation, the switches 308-314 are controlled such that the first input terminal of the comparator 302 is coupled to the node 318 and the second input terminal of the comparator 302 is coupled to the node 316. In this way, an input-referred offset (e.g., a direct-current (DC) offset) of the comparator 302 is averaged over time in an output of the comparator 302.

To maintain a constant polarity output of the comparator 302 when the inputs are chopped, the output of the comparator 302 is multiplexed by the multiplexor 306 with an inverted version of the output of the comparator, generated by the inverter circuit 304. For example, because the inputs to the comparator 302 are chopped (e.g., swapped, thereby introducing a 180 degree phase shift in the output of the comparator 302), it becomes necessary to swap the output of the comparator 302 polarity at some point in the signal path to cancel the 180 degree phase shift introduced at the input to the comparator 302. A control signal for controlling the switch 308 and the switch 312 determines which input of the multiplexor 306 is output by the multiplexor (e.g., as HS_TERM_ILIM_int, when the circuit 300 is implemented as the comparator 212 and/or LS_TERM_ILIM_int when the circuit 300 is implemented as the comparator 214). For example, when the first input terminal of the comparator 302 is coupled to the node 316 and the second input terminal of the comparator 302 is coupled to the node 318, the multiplexor 306 is controlled to output the signal output by the inverter circuit 304 as the output of the multiplexor 306. When the first input terminal of the comparator 302 is coupled to the node 318 and the second input terminal of the comparator 302 is coupled to the node 316, the multiplexor 306 is controlled to output the signal output by the comparator 302 as the output of the multiplexor 306.

Figure 4:
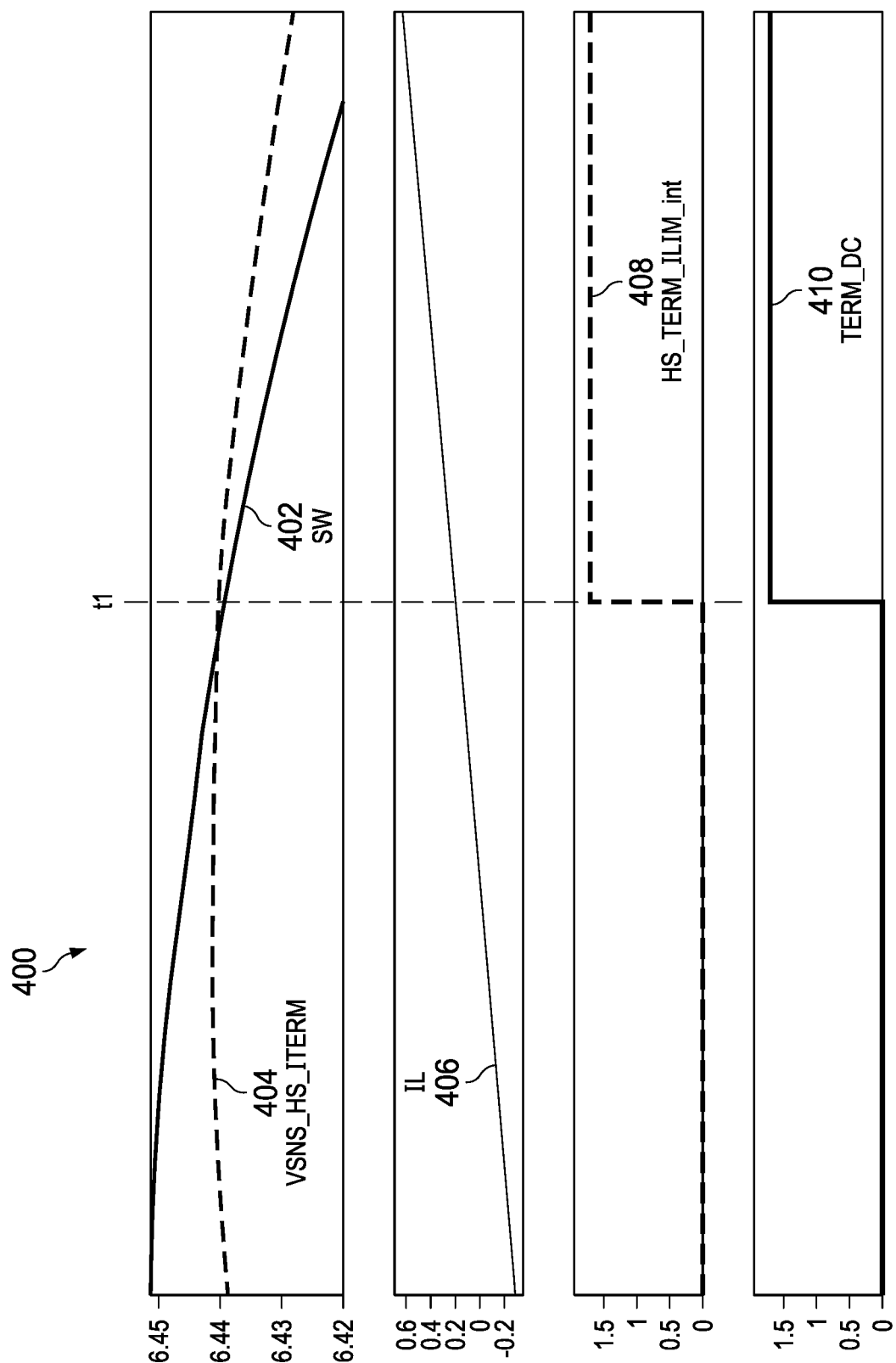
FIG. 4 shows a diagram of illustrative signals in accordance with various examples.

Turning now to FIG. 4, a diagram 400 of illustrative signal waveforms is shown. In at least some examples, the diagram 400 is representative of at least some signals present in the circuit 200 and reference is made to elements of the circuit 200 in describing the diagram 400. As discussed above, SW, designated as signal 402 in FIG. 4, is present at the node 238, VSNS_HS_ITERM, designated as signal 404 in FIG. 4, is present at the node 244, IL, designated as signal 406 in FIG. 4, is a current of the inductor 206 (also equivalent to an output current of the circuit 200 and, in some examples, a current flowing through a high side FET), HS_TERM_ILIM_int, designated as signal 408 in FIG. 4, is an output signal of the comparator 212, and TERM_DC, designated as signal 410 in FIG. 4, is an output signal of the logic circuit 218.

FIG. 4 shows part of a switching cycle during which time the high side FET is conducting the signal 406. As signal 406 increases in value, the signal 402 falls in value as a voltage drop across the high side FET increases. At time t1, the value of the signal 402 falls below that of the signal 404 indicating that the voltage drop across the high side FET has reached the reference signal value indicating that the termination current has been reached. When this occurs, the signal 408 transitions from a logical low value to a logical high value (or, more generally, from a de-asserted state to an asserted state), causing the signal 410 to also transition from a logical low value to a logical high value (or, again, more generally from a de-asserted state to an asserted state), indicating that the charge termination threshold (e.g., I_TERM_HS, not shown) has been exceeded at this point during this phase of the switching cycle. While FIG. 4 is described with respect to a high side portion of the circuit 200, it is equally applicable to a low side portion of the circuit 200 as well.

Figure 5:
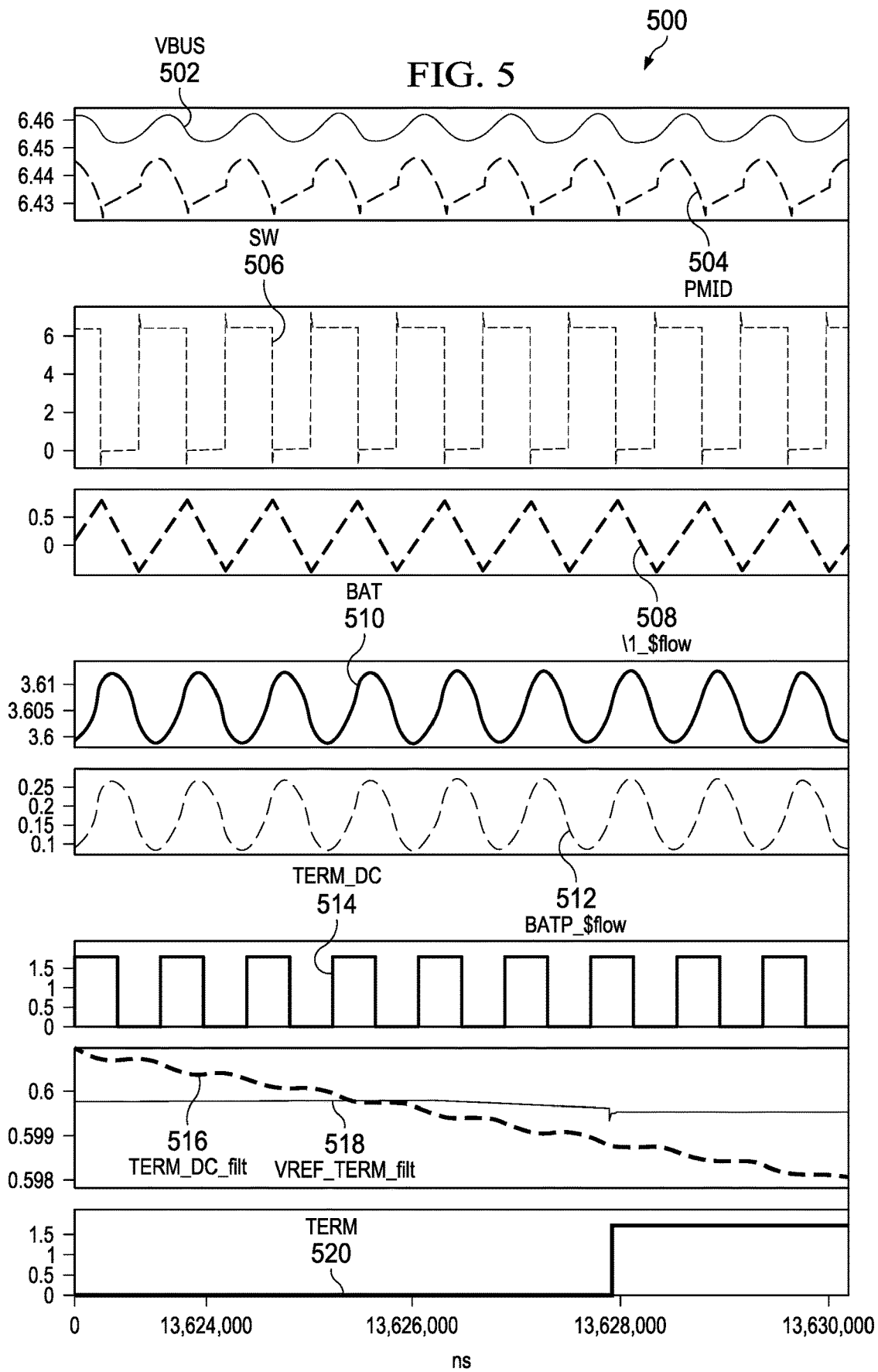
FIG. 5 shows a diagram of illustrative signals in accordance with various examples.

Turning now to FIG. 5, a diagram 500 of illustrative signal waveforms is shown. In at least some examples, the diagram 500 is representative of at least some signals present in the circuit 200 and reference is made to elements of the circuit 200 in describing the diagram 500. In FIG. 5, VBUS is designated as signal 502, PMID is designated as signal 504, SW is designated as signal 506, IL is designated as signal 508, a voltage of the battery 256 is designated as signal 510, a current of the battery 256 is designated as signal 512, TERM_DC is designated as signal 514, TERM_DC_filt is designated as signal 516, VREF_TERM_filt is designated as the signal 518, and TERM is designated as signal 520.

As shown in FIG. 5, the signal 504 approximately tracks a value of the signal 502, minus losses associated with a critical path between the node 234 and the node 236 and/or any losses associated with loading effects caused by one or more components coupled to the node 234 and/or the node 236. Based on HSCTRL and LSCTRL, the switching converter 108 generates the signal 506 at the node 238, energizing and de-energizing the inductor 206 to generate the signal 508. Based on the signal 508, the battery 356 charges, as shown by the signal 510 and the signal 512. When either VSNS_HS_ITERM is greater in value than SW while the high side FET is on or VSNS_LS_ITERM is greater in value than SW when the low side FET is on, the signal 514 has a logical high value. Otherwise, the signal 514 has a logical low value. The signal 514 is filtered to generate the signal 516. When the signal 518 is greater in value than the signal 516, the signal 520 has a logical high value indicating the average output current from the converter is less than the desired termination threshold. Otherwise, such as when the signal 516 is greater in value than the signal 518, the signal 520 has a logical low value. The signal 520 having a logical high value indicates that charging of the battery 256 should terminate as a desired charge termination current has been met.

Figure 6:
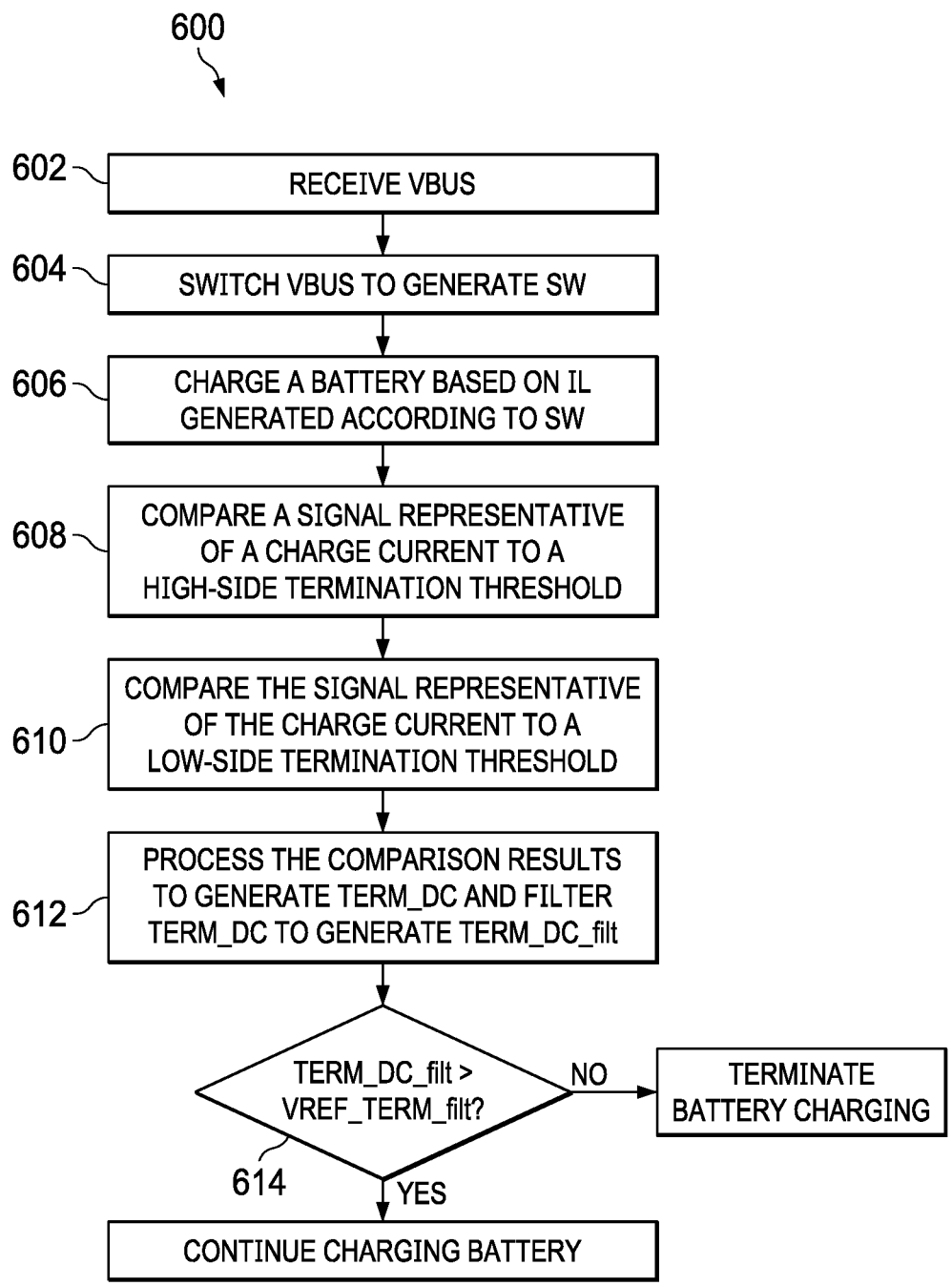
FIG. 6 shows a flowchart of an illustrative method in accordance with various examples.

Turning now to FIG. 6, a flowchart of an illustrative method 600 is shown. In at least some examples, the method 600 is implemented, at least partially, by the circuit 200. In some examples, the method 600 is implemented to charge a rechargeable battery and/or terminate charging of a rechargeable battery. For example, in some implementations the circuit 200 is, or is a component of, a battery charger or a battery charger controller through which, and under the control of which, a rechargeable battery is charged or recharged.

At operation 602, VBUS is received. VBUS is received from any suitable power supply or power source and is a signal for use by a switching converter, such as the switching converter 108, in generating SW for charging a rechargeable battery. In at least some examples, VBUS is provided to one or more additional components via a PMID terminal for use in powering the one or more additional components.

At operation 604, VBUS is switched to generate SW. In at least some examples, VBUS is switched by a switching converter (e.g., a power converter). The switching converter may be buck (such that SW is lesser in value than VBUS), boost (such that SW is greater in value than VBUS), or buck-boost in nature (such that SW can be lesser or greater in value than VBUS). Based on SW being provided at a terminal of an inductor, such as the inductor 206, IL is generated. A switching converter that generates SW from VBUS, in at least some examples, is controlled to operate according to CCM operation to facilitate operation of the method 600.

At operation 606, a battery is charged based on IL. In at least some examples, as a voltage of the battery and/or an amount of charge stored by the battery changes, a rate at which the battery is charging changes. For example, electrical characteristics of the battery change as the battery voltage increases and/or the amount of energy stored by the battery increases. As the battery voltage increases and/or the amount of energy stored by the battery increases, the rate at which the battery charges (e.g., an amount of current drawn by the battery to charge, or the charge current) decreases.

At operation 608, a signal representative of the charge current is compared to a high side charge termination threshold. The signal representative of the charge current is, in some examples, SW. The high side charge termination threshold is, in some examples, VSNS_HS_ITERM and is determined at least partially according to ITERM_HS. The comparison is performed by a comparator that is, in some examples, a chopped comparator as discussed in greater detail elsewhere herein. The signal representative of the charge current is compared to the high side charge termination threshold, in at least some examples, to determine whether the charge current has fallen below the high side charge termination threshold.

At operation 610, the signal representative of the charge current is compared to a low side charge termination threshold. The signal representative of the charge current is, in some examples, SW. The low side charge termination threshold is, in some examples, VSNS_LS_ITERM and is determined at least partially according to ITERM_LS. The comparison is performed by another comparator that is, in some examples, a chopped comparator as discussed in greater detail elsewhere herein. The signal representative of the charge current is compared to the low side charge termination threshold, in at least some examples, to determine whether the charge current has risen above the low side charge termination threshold.

At operation 612, comparison results of the operation 608 and the operation 610 are processed to generate TERM_DC and then TERM_DC is filtered to generate TERM_DC_filt. TERM_DC is filtered, in at least some examples, by a RC filter circuit. At operation 614, TERM_DC_filt is compared to VREF_TERM_filt. When VREF_TERM_filt is lesser in value than TERM_DC_filt, a result of the comparison, TERM, has a logical low value indicating that charging of the rechargeable battery should continue because a charge termination threshold (e.g., the high side charge termination threshold or the low side termination threshold) has not been met. When VREF_TERM_filt is greater in value than TERM_DC_filt, TERM has a logical high value indicating that charging of the rechargeable battery should terminate because the charge termination threshold (e.g., the high side charge termination threshold or the low side termination threshold) has been met.

While the operations of the method 600 have been discussed and labeled with numerical reference, in various examples the method 600 includes additional operations that are not recited herein, in some examples any one or more of the operations recited herein include one or more sub-operations (e.g., such as intermediary comparisons, logical operations, output selections such as via a multiplexer, etc.), in some examples any one or more of the operations recited herein is omitted, and/or in some examples any one or more of the operations recited herein is performed in an order other than that presented herein (e.g., in a reverse order, substantially simultaneously, overlapping, etc.), all of which is intended to fall within the scope of the present disclosure.

In the foregoing discussion, the terms "including" and "comprising" are used in an open-ended fashion, and thus should be interpreted to mean "including, but not limited to . . . ." The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

While certain components are described herein as being of a particular process technology (e.g., FET, MOSFET, n-type, p-type, etc.), these components may be exchanged for components of other process technologies (e.g., replace FET and/or MOSFET with bi-polar junction transistor (BJT), replace n-type with p-type or vice versa, etc.) and reconfiguring circuits including the replaced components to provide desired functionality at least partially similar to functionality available prior to the component replacement. Components illustrated as resistors, unless otherwise stated, are generally representative of any one or more elements coupled in series and/or parallel to provide an amount of impedance represented by the illustrated resistor. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about", "approximately", or "substantially" preceding a value means +/−10 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. A circuit, comprising:
   a first transistor having a first gate, a first drain, and a first source, the first gate and the first drain adapted to be coupled to a high-side power transistor;
   a first comparator circuit having a first comparator circuit input, a second comparator circuit input, and a first comparator circuit output, the first comparator circuit input coupled to the first source;
   a second transistor having a second gate, a second source, and a second drain, the second gate and the second drain adapted to be coupled to a low-side power transistor;
   a second comparator circuit having a third comparator circuit input, a fourth comparator circuit input, and a second comparator circuit output, the third comparator circuit input coupled to the second source, and the third comparator circuit input coupled to a ground terminal;
   a logic circuit having first logic input, a second logic input, and a logic output, the first logic input coupled to the first comparator circuit output, and the second logic input coupled to the second comparator circuit output;
   a filter having a filter input and a filter output, the filter input coupled to the logic output; and
   a comparator having a first comparator input, a second comparator input, and a comparator output, the first comparator input coupled to the filter output.

2. The circuit of claim 1, further comprising a delay circuit coupled between the second comparator circuit output and the second logic input.

3. The circuit of claim 1, wherein the filter comprises:
   a resistor having a first resistor terminal and a second resistor terminal, the first resistor terminal coupled to the logic output; and
   a capacitor coupled between the second resistor terminal and the ground terminal.

4. The circuit of claim 1, further comprising:
   an inductor having a first inductor terminal and a second inductor terminal, the first inductor terminal coupled to the second drain; and
   a rechargeable battery coupled between the second inductor terminal and the ground terminal.

5. The circuit of claim 1, the comparator is a first comparator and the comparator output is a first comparator output, and wherein the first comparator circuit comprises:
   a second comparator having a third comparator input, a fourth comparator input, and a second comparator output;
   a first switch coupled between the first comparator circuit input and the third comparator input;
   a second switch coupled between the second comparator circuit input and the third comparator input;
   a third switch coupled between the second comparator circuit input and the fourth comparator input;
   a fourth switch coupled between the first comparator circuit input and the fourth comparator input;
   an inverter having an inverter input and an inverter output, the inverter input coupled to the second comparator output; and
   a multiplexer having a first multiplexer input, a second multiplexer input, and a multiplexer output, the first multiplexer input coupled to the inverter output, the second multiplexer input coupled to the second comparator output, and the multiplexer output coupled to the first comparator circuit output,
   wherein the first switch, the third switch, and an input selection terminal of the multiplexer are configured to receive a first control signal, and wherein the second switch and the fourth switch are configured to receive an inverse of the first control signal.

6. The circuit of claim 5, wherein the third comparator input and the fourth comparator input are each chopped between the first comparator circuit input and the second comparator circuit input based on the first control signal and the inverse of the first control signal.

7. The circuit of claim 1, further comprising:
   a first current source coupled between the first source and the ground terminal, the first current source configured to sink current from the first source to the ground terminal; and
   a second current source coupled between a voltage terminal and the second source, the second current source configured to source current to the second source from the voltage terminal.

8. A circuit, comprising:
   a first transistor having a first gate, a first source, and a first drain, the first gate and the first drain adapted to be coupled to a high-side power transistor, and the first source coupled to a first node;
   a second transistor having a second gate, a second source, and a second drain, the second gate and the second drain adapted to be coupled to a low-side power transistor, and the second source coupled to a second node;
   a first chopped comparator circuit configured to produce a first comparison result based on a first voltage at the first node and a second voltage at a third node;
   a second chopped comparator circuit configured to produce a second comparison result based on a third voltage at the second node and a fourth voltage at a ground node;
   a logic circuit configured to produce a logic output based on the first comparison result and the second comparison result;
   a filter configured to filter the logic output; and
   a first comparator configured to:
      compare a reference signal to the filtered output signal of the logic circuit; and
      produce a third comparison result based on a value of the reference signal and the filtered output signal of the logic circuit.

9. The circuit of claim 8, wherein the first chopped comparator circuit is further configured to:
   chop a first input of a second comparator between the first node and the second node;
   chop a second input of the second comparator between the second node and the first node; and
   produce a fourth comparison result based on signals received at the first input of the second comparator and the second input of the second comparator, and
   wherein the second chopped comparator circuit is configured to:
      chop a first input of a third comparator between the third node and the ground node;
      chop a second input of the third comparator between the ground node and the third node; and
      produce a fifth comparison result based on signals received at the first input of the third comparator and the second input of the third comparator.

10. The circuit of claim 9, wherein the first chopped comparator circuit comprises:
    the second comparator having a third comparator input, a fourth comparator input, and a second comparator output;

a first switch coupled between the first node and the third comparator input;
a second switch coupled between the third node and the third comparator input;
a third switch coupled between the third node and the fourth comparator input;
a fourth switch coupled between the first node and the fourth comparator input;
an inverter having an inverter input and an inverter output, the inverter input coupled to the second comparator output; and
a multiplexer having a first multiplexer input, a second multiplexer input, and a multiplexer output, the first multiplexer input coupled to the inverter output, the second multiplexer input coupled to the second comparator output, and the multiplexer output coupled to a first input of the logic circuit,
wherein the first switch, the third switch, and an input selection terminal of the multiplexer are configured to receive a first control signal, and wherein the second switch and the fourth switch are configured to receive an inverse of the first control signal.

11. The circuit of claim 10, wherein the third comparator input and the fourth comparator input are each chopped between the first node and the third node based on the first control signal and the inverse of the first control signal.

12. The circuit of claim 8, further comprising:
a first current source coupled between the first node and the ground node, and the first current source configured to sink current from the first node to the ground node; and
a second current source coupled between a fourth node and the second node, and the second current source configured to source current to the second node from the fourth node.

13. The circuit of claim 8, further comprising a delay circuit configured to delay the second comparison result between the second chopped comparator circuit and the logic circuit.

14. The circuit of claim 8, wherein the filter is configured to filter the logic output.

15. The circuit of claim 8, further comprising:
an inductor coupled between the third node and a fifth node; and
a battery coupled between the fifth node and the ground node,
wherein the circuit is configured to:
charge the battery when the first comparison result is de-asserted; and
terminate charging the battery when the first comparison result is asserted.

16. A system, comprising:
a battery coupled between a first node and a ground node;
an inductor coupled to the battery; and
a battery charger coupled to the inductor, the battery charger configured to charge the battery and terminate charging the battery when a charge current falls below a threshold, the battery charger comprising:
a switching converter configured to switch a bus voltage between a second node and a third node; and
a current measurement circuit configured to monitor charging of the battery, the current measurement circuit comprising:
a first transistor having a first gate, a first source, and a first drain, the first drain and the first gate coupled to a high-side transistor of the switching converter, and the first source coupled to a fourth node;

a second transistor having a second gate, a second source, and a second drain, the second gate and the second drain coupled to a low-side transistor of the switching converter, and the second source coupled to a fifth node;
a first chopped comparator circuit configured to produce a first comparison result based on values at the fourth node and the third node;
a second chopped comparator circuit configured to produce a second comparison result based on values at the fifth node and the ground node;
a logic circuit configured to produce a logic output based on the first comparison result and the second comparison result;
a filter configured to filter the logic output; and
a first comparator configured to:
compare a reference signal to the filtered output signal of the logic circuit, the reference signal representative of the threshold; and
produce a third comparison result based on a value of the reference signal with respect to the filtered output signal of the logic circuit.

17. The system of claim 16, wherein the first chopped comparator circuit is further configured to:
chop a first input of a second comparator between the fourth node and the third node;
chop a second input of the second comparator between the third node and the fourth node; and
produce a fourth comparison result based on signals received at the first input of the second comparator and the second input of the second comparator, and wherein the second chopped comparator circuit is configured to:
chop a first input of a third comparator between the fifth node and the ground node;
chop a second input of the third comparator between the ground node and the third node; and
produce a fifth comparison result based on signals received at the first input of the third comparator and the second input of the third comparator.

18. The system of claim 17, wherein the first chopped comparator circuit comprises:
the second comparator, having a first comparator input, a second comparator input, and a comparator output;
a first switch coupled between the fourth node and the first comparator input;
a second switch coupled between the third node and the first comparator input;
a third switch coupled between the third node and the second comparator input;
a fourth switch coupled between the fourth node and the second comparator input;
an inverter having an inverter input and an inverter output, the inverter input coupled to the comparator output; and
a multiplexer having a first multiplexer input, a second multiplexer input, and a multiplexer output, the first multiplexer input coupled to the inverter output, the second multiplexer input coupled to the comparator output, and the comparator output coupled to a logic input of the logic circuit,
wherein the first switch, the third switch, and an input selection terminal of the multiplexer are configured to receive a first control signal, and wherein the second switch and the fourth switch are configured to receive an inverse of the first control signal.

19. The system of claim 18, wherein the first comparator input and the second comparator input are each chopped between the fourth node and the third node based on the first control signal and the inverse of the first control signal.

20. The system of claim 16, wherein the filter comprises:
a resistor coupled between the logic output and a sixth node; and
a capacitor coupled between the sixth node and the ground node, wherein the filtered output signal of the logic circuit is at the sixth node.

21. The system of claim 16, wherein the current measurement circuit is configured to:
control the battery charger to charge the battery when the first comparison result has a first logical value; and
control the battery charger to terminate charging of the battery when the first comparison result has a second logical value.

22. The system of claim 21, wherein the system controls the switching converter to operate in a continuous conduction mode of operation to cause an accuracy of the current measurement circuit to be less than about 100 milliamps.

* * * * *